Figure 1:
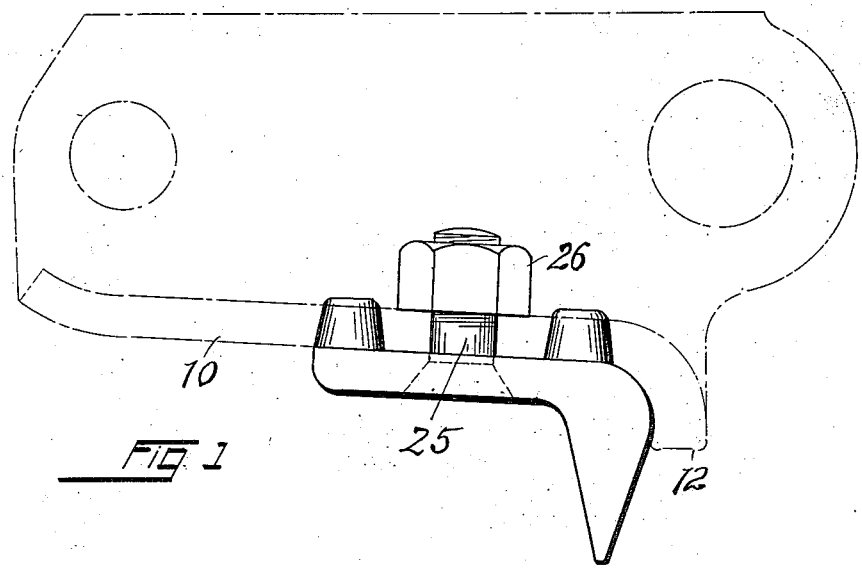

May 22, 1923.

R. H. WHITE

TRACK BELT CALK

Filed July 20, 1920

1,456,348

Inventor
Rollin H White
By Thurston Kwis & Hudson
Attorneys

Patented May 22, 1923.

1,456,348

UNITED STATES PATENT OFFICE.

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

TRACK-BELT CALK.

Application filed July 20, 1920. Serial No. 397,784.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Track-Belt Calks, of which the following is a full, clear, and exact description.

The object of the present invention is to enable one to quickly and easily adapt a track laying tractor for working most advantageously on different kinds of surfaces.

The invention consists of a calk which is so constructed that it may be quickly but securely fastened to the lower face of the shoe of a track belt link; and the combination of this calk with the track belt link substantially as shown in the drawing and hereinafter described and pointed out definitely in the appended claims.

Figure 2:
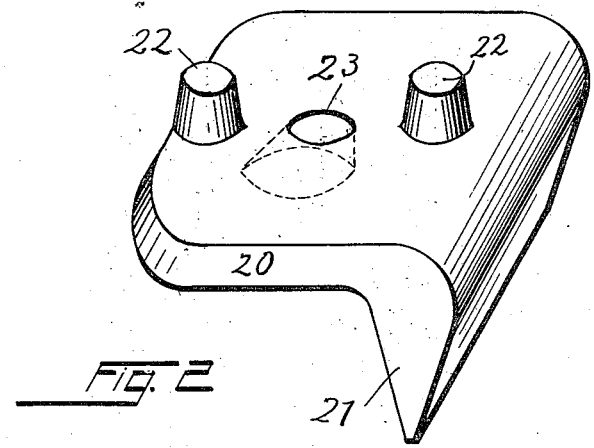

In the drawing, Fig. 1 is a side elevation of a calk and showing its application to a track belt link. Fig. 2 is a perspective view of the calk.

A track belt in a track laying tractor is made up of a plurality of pivoted together links. Calks like that which is herein shown are intended to be secured, when necessary, to as many of the belt links as may be deemed desirable,—one calk to each link.

Track belt links to which these calks are adapted are of familiar construction, and include a ground engaging shoe or bottom plate 10, at the front end of which is a downturned transversely extended grouser rib 12.

The calk 20 is shaped to fit against the lower face of the shoe and the curved rear face of the grouser rib; and it has at its front a transverse downwardly extended rib 21 which, when the calk is in place, projects considerably below the lower edge of the grouser rib 12.

On the upper face of the calk are two upwardly extended tapered bosses 22; and between them a countersunk bolt hole 23.

In the shoe 10 are holes to which the bosses 22 are fitted, and likewise the hole which is aligned with the hole 23 in the calk, when the bosses are in the holes in the shoe. A bolt 25 having a head 24 which fits in the countersunk hole 23, passes through the hole in the shoe, and a nut 26 is screwed onto this bolt, thereby securely holding the calk to the shoe.

Having described my invention, I claim:—

1. In a track belt for track laying tractors, the combination with a track belt link having a bottom plate, said plate being provided with openings and having an end thereof formed with a downwardly extending rib, of a calk having a face which engages with the bottom plate of the link and having an angular projecting portion at one end thereof, the outer surface of the angular projecting portion engaging with the inner surface of the rib on the link, said projection extending below the rib on the link, detachable means for securing the calk to the link, and means extending from said calks into the openings in said bottom plate to prevent twisting movement of the calk.

2. In a track belt for track laying tractors, the combination with a track belt link having a bottom plate at the end of which is formed a transversely extending rib, of a calk having a portion which fits against the bottom plate of the link and having an angular extension which engages with the inner surface of the rib on the link but extends below said rib, the calk being formed with two projections and the link having two openings into which said projections extend and a bolt for fastening the calk to the plate, thereby securing the calk to the plate and preventing relative turning movement.

In testimony whereof, I hereunto affix my signature.

ROLLIN H. WHITE.